US005680271A

United States Patent [19]
Yatsu

[11] Patent Number: 5,680,271
[45] Date of Patent: Oct. 21, 1997

[54] CONTROL DEVICE OF THE DISK APPARATUS FOR POSITIONING A HEAD ON A DISK

[75] Inventor: Masahide Yatsu, Tokyo, Japan

[73] Assignee: Kabushiki Kaisha Toshiba, Kawasaki, Japan

[21] Appl. No.: 528,006

[22] Filed: Sep. 14, 1995

[30] Foreign Application Priority Data

Sep. 11, 1995 [JP] Japan .................... 7-232750

[51] Int. Cl.$^6$ .................................. G11B 5/596
[52] U.S. Cl. .......................... 360/78.09; 364/165
[58] Field of Search ................ 360/78.09, 78.04, 360/75; 318/560, 561; 364/149, 164, 165, 161, 162, 163

[56] References Cited

U.S. PATENT DOCUMENTS

| | | | |
|---|---|---|---|
| 4,200,827 | 4/1980 | Oswald | 318/561 |
| 4,297,734 | 10/1981 | Laishley | 360/78.09 |
| 4,697,127 | 9/1987 | Stich et al. | 360/78.09 X |
| 4,894,599 | 1/1990 | Ottesen | 360/78.09 X |
| 5,223,778 | 6/1993 | Svarovsky | 364/165 X |
| 5,504,672 | 4/1996 | Hardiman | 364/165 |
| 5,510,939 | 4/1996 | Lewis | 360/78.09 |

FOREIGN PATENT DOCUMENTS 5 6635  1/1993  Japan .

OTHER PUBLICATIONS

English translation for abstract of Japanese Pat. No. 05-6635, published Jan. 14, 1993.

*Primary Examiner*—Aristotelis M. Psitos
*Assistant Examiner*—Alan Faber
*Attorney, Agent, or Firm*—Oblon, Spivak, McClelland, Maier & Neustadt, P.C.

[57] ABSTRACT

A head positioning system includes a feedforward operation controller which calculates a basic head position control signal to output to a head displacement providing device based upon the target track the head is to be moved to and the present head position at the time when a head positioning operation begins. Subsequently, a feedback corrected control signal for head positioning is calculated by a feedback operation controller using a detected signal indicating actual head position relative to the record disk. Until the results from the feedback operation controller are available, the basic head position control signal is utilized for the head positioning operation. This basic head position control signal is also used for controlling head positioning whenever an output from the feedback operation controller is not being provided. When outputs from the feedback operation controller are provided, they are added with the basic head position control signal to form a combined position control signal to control head movement.

3 Claims, 6 Drawing Sheets

CONTROL DEVICE OF THE DISK APPARATUS FOR POSITIONING A HEAD ON A DISK

BACKGROUND OF THE INVENTION

1. Field of the Invention

The present invention relates to a control device of the disk apparatus and, more particularly, to a control device of the disk apparatus for positioning a head on a disk.

2. Description of the Related Art

FIG. 7 is a diagram showing a controlling system using a conventional control device which employs both feedforward and feedback controllers.

Referring to FIG. 7, reference numeral 1 denotes a feedback controller; 2, a feedforward controller; 3, an adder; 4, a time lag element; 5, a DAC (digital/analog converter); 6, a controlled system; and 7, an adder.

The feedback controller 1 and the feedforward controller 2 are one and the same digital arithmetic unit (CPU).

The operation of this control device will be described with reference to the flow chart in FIG. 8.

First, the feedforward controller 2 performs an arithmetic control operation with respect to a target variable (step 1). By this time, the operation time of the feedforward controller 2 requires a time lag $\tau_2$.

The feedback controller 1 performs an arithmetic control operation (step 2). By this time, the operation time of the feedback controller 1 requires a time lag $\tau_1$.

After the lapse of a lag time ($\tau_1+\tau_2$), the sum of the arithmetic operation results of the feedback and feedforward controllers 1 and 2 is output to the DAC 5 as a control signal (step 3).

FIG. 9 is a chart for explaining a digital control signal which is output from the DAC 5 to the controlled system 6.

As shown in FIG. 9, the digital control signal is output from the DAC 5 with a lag of a predetermined period of time since a sample point, so that the sum is output to the DAC 5 after arithmetic operations of the feedback and feedforward controllers 1 and 2 are completed. In FIG. 9, hatched portions indicate a control signal output from the feedback controller 1.

As described above, one digital arithmetic unit (CPU) calculates feedback controller 1 and the feedforward controller 2 two control amounts for the feedback controller 1 and the feedforward controller 2, respectively, adds these control amounts, and outputs the resultant sum as a control signal. Inevitably, there is made a delay which the time the central processing unit requires to calculate the two control amounts.

This control lag time degrades the phase characteristics of the controlling system, thereby degrading the control performance of the control device. When this control device is used for positioning a head on a disk, the control performance of head positioning is degraded due to the control lag time.

SUMMARY OF THE INVENTION

The present invention has been made in view of the above situation, and has as its object to provide a control device of the disk apparatus capable of decreasing degradation in control performance accompanying a control lag time.

According to the first aspect of the present invention, there is provided a control device of the disk apparatus that outputs a control signal for positioning a head at a target track based on position information indicating a position of the head and a target variable, wherein the control device outputs a larger number of control signals than a number of times of crossing of the head which moves across pieces of position information recorded on the disk per unit time.

According to the second aspect of the present invention, there is provided a control device of the disk apparatus that outputs a control signal for positioning a head at a target track based on position information indicating a position of the head and a target variable, wherein the control device comprises a feedforward controller and a feedback controller, and outputs a control signal output from the feedforward controller prior to a control signal output from the feedback controller.

According to the third aspect of the present invention, there is provided a control device of the disk apparatus that outputs a control signal for positioning a head at a target track based on position information indicating a position of the head and a target variable, wherein the control device comprises a feedforward controller and a feedback controller, and sequentially outputs control signals upon completion of an arithmetic operation by each of the feedback and feedforward controllers.

According to the fourth aspect of the present invention, there is provided a control device of the disk apparatus that outputs a control signal for positioning a head at a target track based on position information indicating a position of the head and a target variable, wherein the control device comprises a plurality of feedforward controllers, and sequentially outputs control signals upon completion of an arithmetic operation by each of the feedforward controllers.

According to the fifth aspect of the present invention, there is provided a control device that outputs a control signal for positioning a head at a target track based on position information indicating a position of the head and a target variable, wherein the control device comprises a plurality of feedback controllers, and sequentially outputs control signals upon completion of an arithmetic operation by each of the feedback controllers.

With the above arrangement, the control device can output a control signal to the controlled system without waiting for control signals from a plurality of controllers. Thus, a degradation in head positioning control performance accompanying a control lag time can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The preferred embodiments of the present invention will be described with reference to the accompanying drawings.

<First Embodiment>

Figure 1:
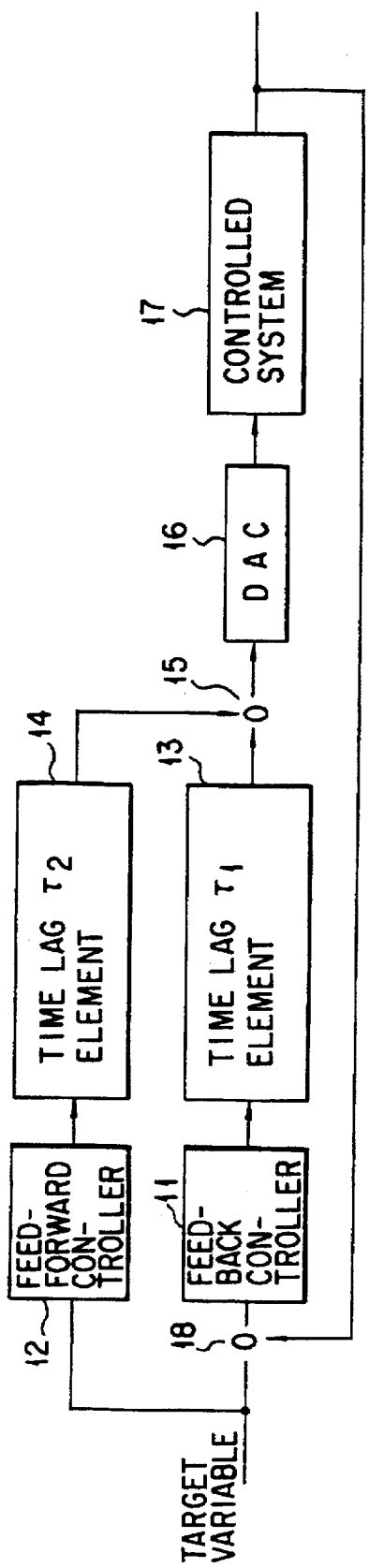
FIG. 1 is a block diagram showing the arrangement of the controlling system of a control device according to the first embodiment of the present invention.

FIG. 1 is a diagram showing the arrangement of the controlling system of a control device according to the first embodiment of the present invention.

Referring to FIG. 1, reference numeral 11 denotes a feedback controller; 12, a feedforward controller; 13, the time lag element of the feedback controller 11; 14, the time lag element of the feedforward controller 12; 15, an adder; 16, a DAC (digital/analog converter); 17, a controlled system; and 18, an adder for adding a process amount and a command.

The feedback controller 1 and the feedforward controller 2 are one and the same digital arithmetic unit (CPU).

Figure 2:
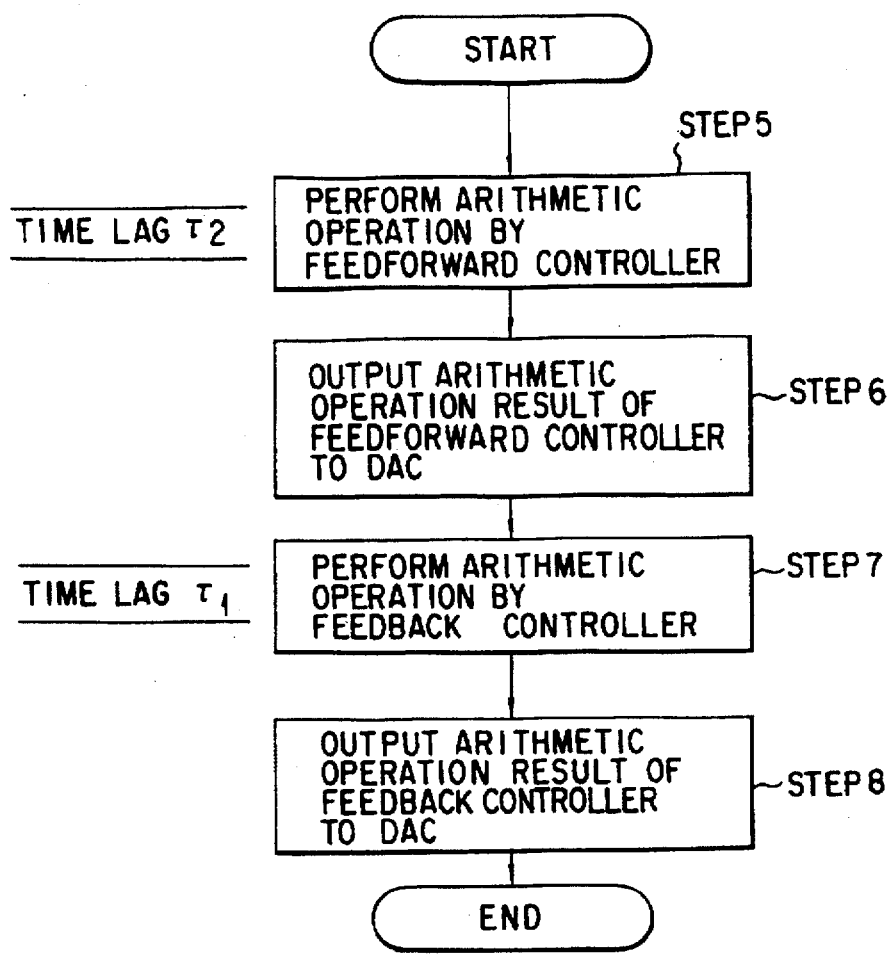
FIG. 2 is a flow chart for explaining the operation of the control device of the first embodiment.

The operation of this control device will be described with reference to the flow chart of FIG. 2.

First, the feedforward controller 12 performs an arithmetic control operation with respect to a target variable (step 5). By this then, the operation time of the feedforward controller 12 requires a lag time $\tau_2$.

After the lapse of the lag time $\tau_2$, only a control signal from the feedforward controller 12 is output to the DAC 16 through the adder 15 (step 6).

The feedback controller 11 performs an arithmetic control operation (step 7). By this then, the operation time of the feedback controller 11 requires a lag time $\tau_1$. After the lapse of the lag time $\tau_1$, a control signal from the feedback controller 11 is added to the control signal from the feedforward controller 12, and the sum signal is output to the DAC 16 (step 8).

Figure 3:
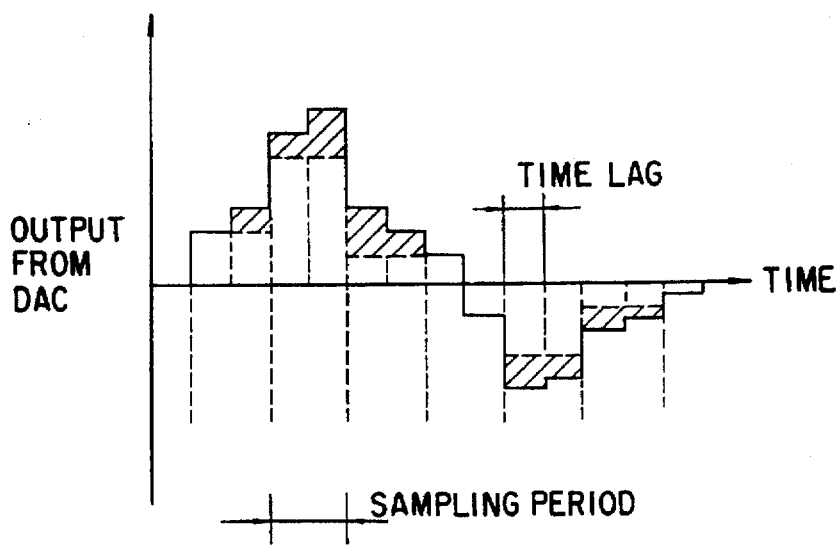
FIG. 3 is a timing chart for explaining a digital control signal output from the DAC of the controlling system of the control device of the first embodiment to a controlled system.

FIG. 3 is a timing chart for explaining a digital control signal which is output from the DAC 16 to the controlled system 17. FIG. 3 shows an output from the DAC 16 obtained when a lag time $\tau_2$ of the feedforward controller 12 is almost 0. In FIG. 3, hatched portions indicate control signals output from the feedback controller 11.

As shown in FIG. 3, since the operation result is output to the DAC 16 immediately after the arithmetic operation of the feedforward controller 12 is completed, the control lag time is 0. More specifically, since the control signals from the controllers that have completed arithmetic operations are sequentially output, a degradation in control performance accompanying the control lag time is less than that in the conventional control device.

Figure 4:
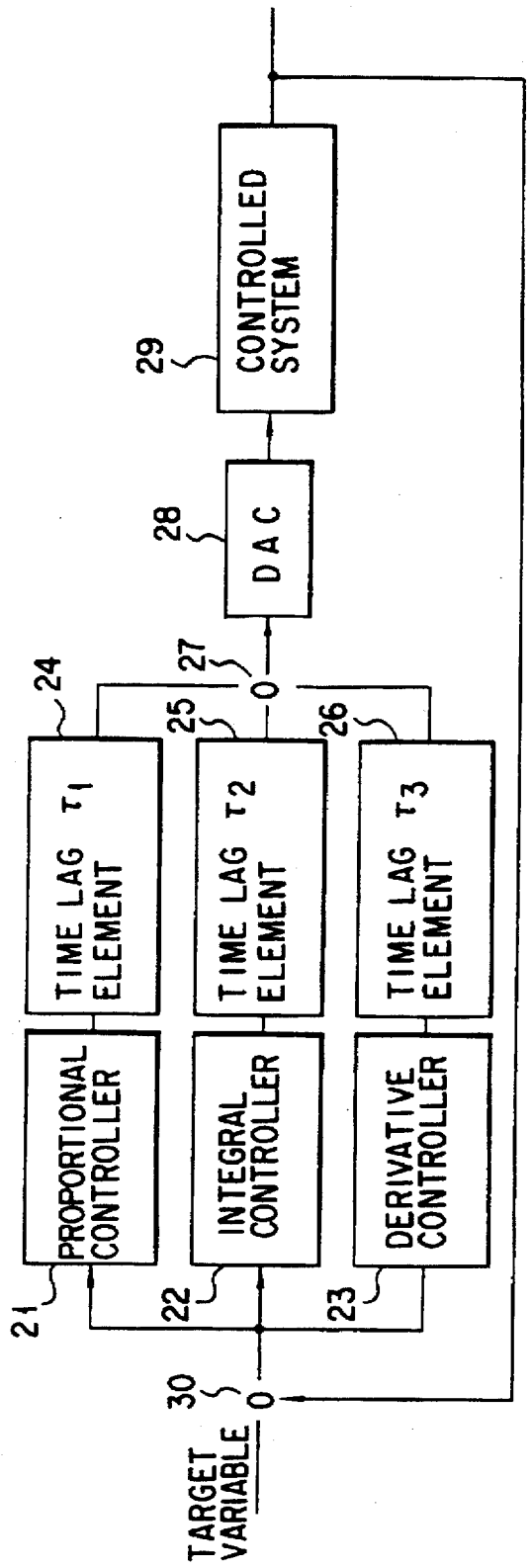
FIG. 4 is a diagram showing a modification of the control device of the first embodiment.

FIG. 4 shows a modification of the control device of the first embodiment.

Referring to FIG. 4, reference numeral 21 denotes a proportional controller 21; 22, an integral controller; 23, a derivative controller; 24, the time lag element of the proportional controller 21; 25, the time lag element of the integral controller 22; 26, the time lag element of the derivative controller 23; 27, an adder; 28, a DAC; 29, a controlled system; and 30, an adder.

In the control device constituted by only feedback controllers as shown in FIG. 4, similarly, the controllers that have completed arithmetic operations sequentially output control signals to the DAC 28. In this case, if the proportional controller 21, the derivative controller 23, and the integral controller 22 output control signals in this order, the control performance is more improved.

In the above description, only a control device constituted by a combination of feedback and feedforward controllers and a control device constituted by only feedback controllers have been described. However, the present invention is similarly applied to a control device which is constituted by only feedforward controllers.

<Second Embodiment>

A magnetic disk apparatus employing a control device according to the second embodiment of the present invention will be described.

Figure 5:
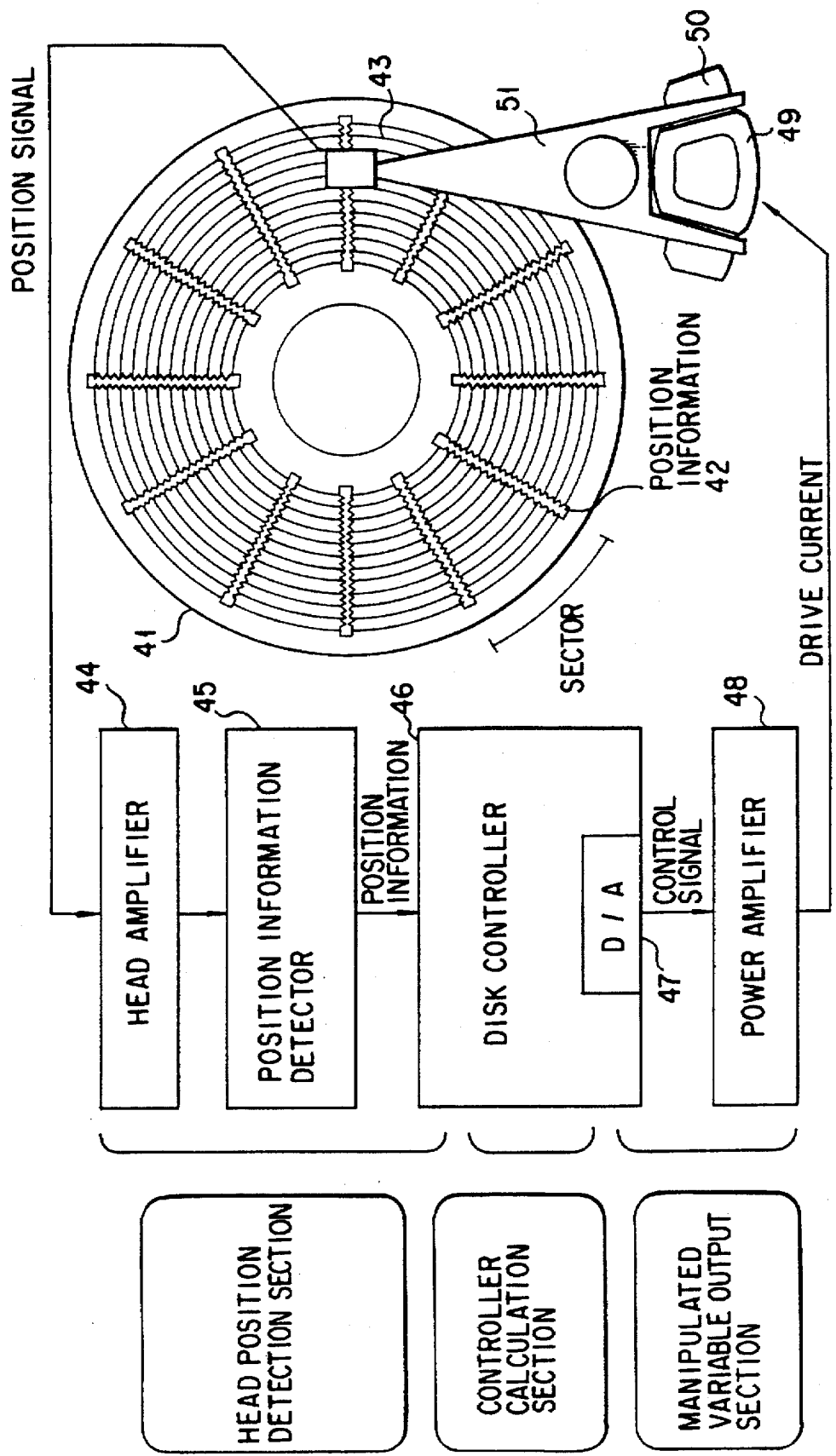
FIG. 5 is a diagram showing the arrangement of a magnetic disk apparatus using a control device according to the second embodiment of the present invention.

FIG. 5 is a diagram showing the arrangement of the magnetic disk apparatus employing the control device according to the second embodiment of the present invention.

Referring to FIG. 5, position information 42 for detecting a head position is recorded on a specific area of a magnetic disk plate 41. A position signal read by a head 43 of the magnetic disk apparatus is loaded by a disk controller (microcontroller) 46 as position information indicating the position of the head 43 through a head amplifier 44 and a position information detector 45.

The disk controller 46 performs an arithmetic control operation in accordance with preset control rules, and outputs the result of the arithmetic control operation as an analog control signal through a digital/analog converter 47. This analog control signal is output to a coil 49 provided to the drive system of the head 43 as a drive current through a power amplifier 48.

This drive current generates a repulsive force between the coil 49 and a magnet 50, so that the head 43 mounted to a carriage 51 is positioned.

Figure 6A:
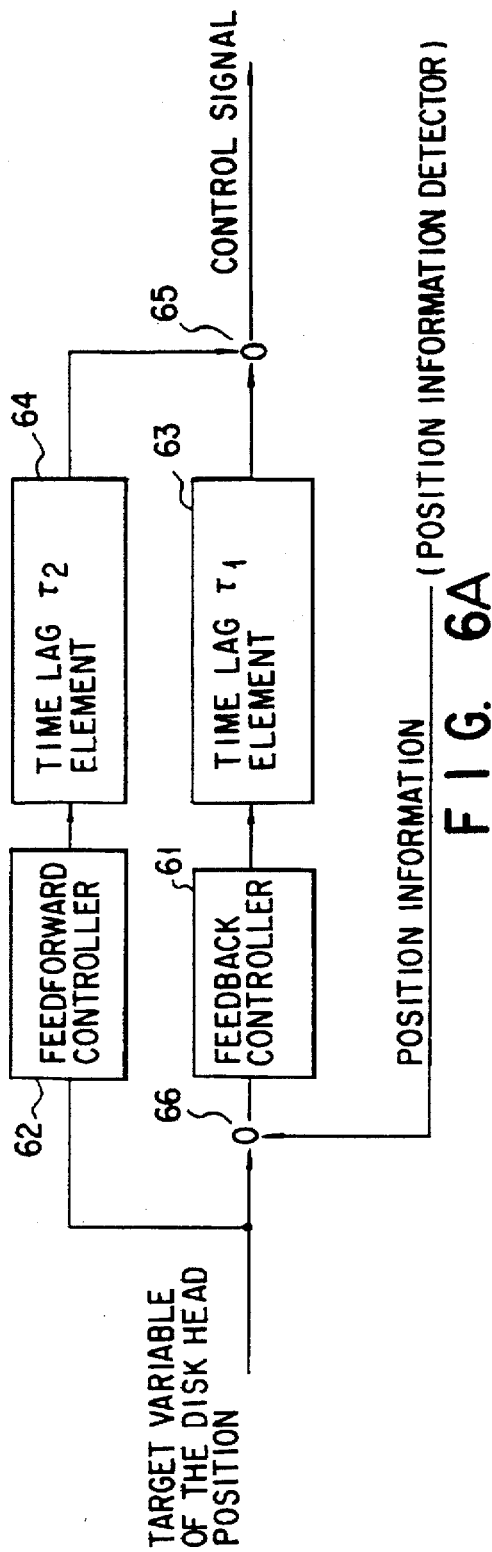
FIG. 6A is a block diagram for explaining the control method of the disk controller of the magnetic disk apparatus using the control device of the second embodiment.
Figure 7:
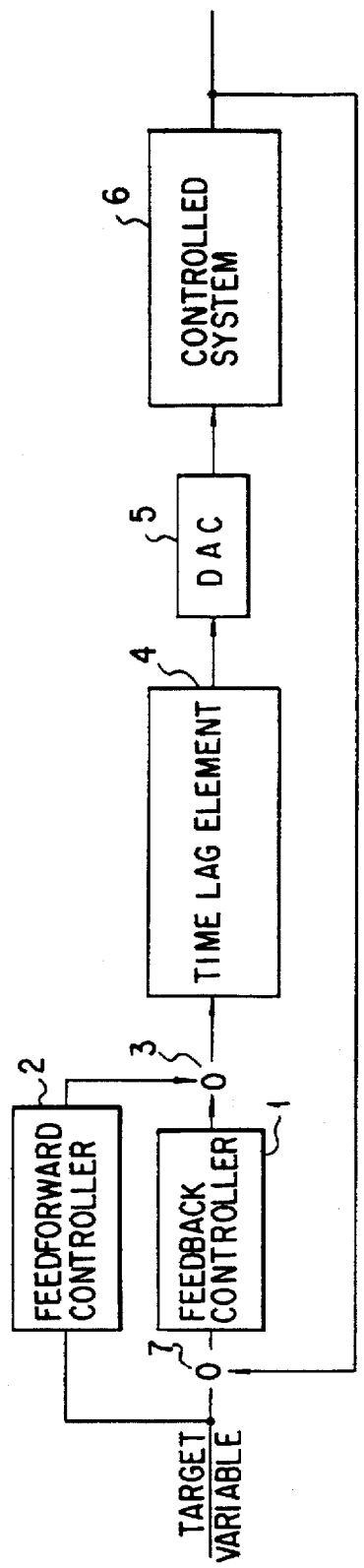
FIG. 7 is a block diagram showing a controlling system that uses a conventional control device using both feedback and feedforward controllers.

FIG. 6A is a block diagram for explaining the control method of the disk controller.

As shown in FIG. 6, a feedback controller 61 and a feedforward controller 62 for positioning the head 43 at a target position are provided in the disk controller 46. Reference numeral 63 denotes the time lag element of the feedback controller 61; 64, the time lag element of the feedforward controller 62; and 65 and 66, adders.

As both the feedback and feedforward controllers 61 and 62 are digital controllers, in calculation of a manipulated variable, they have arithmetic operation lag times due to the limited performance of the disk controller. Assume that the arithmetic operation lag times of the feedback and feedforward controllers 61 and 62 are respectively $\tau_1$ and $\tau_2$.

Figure 6B:
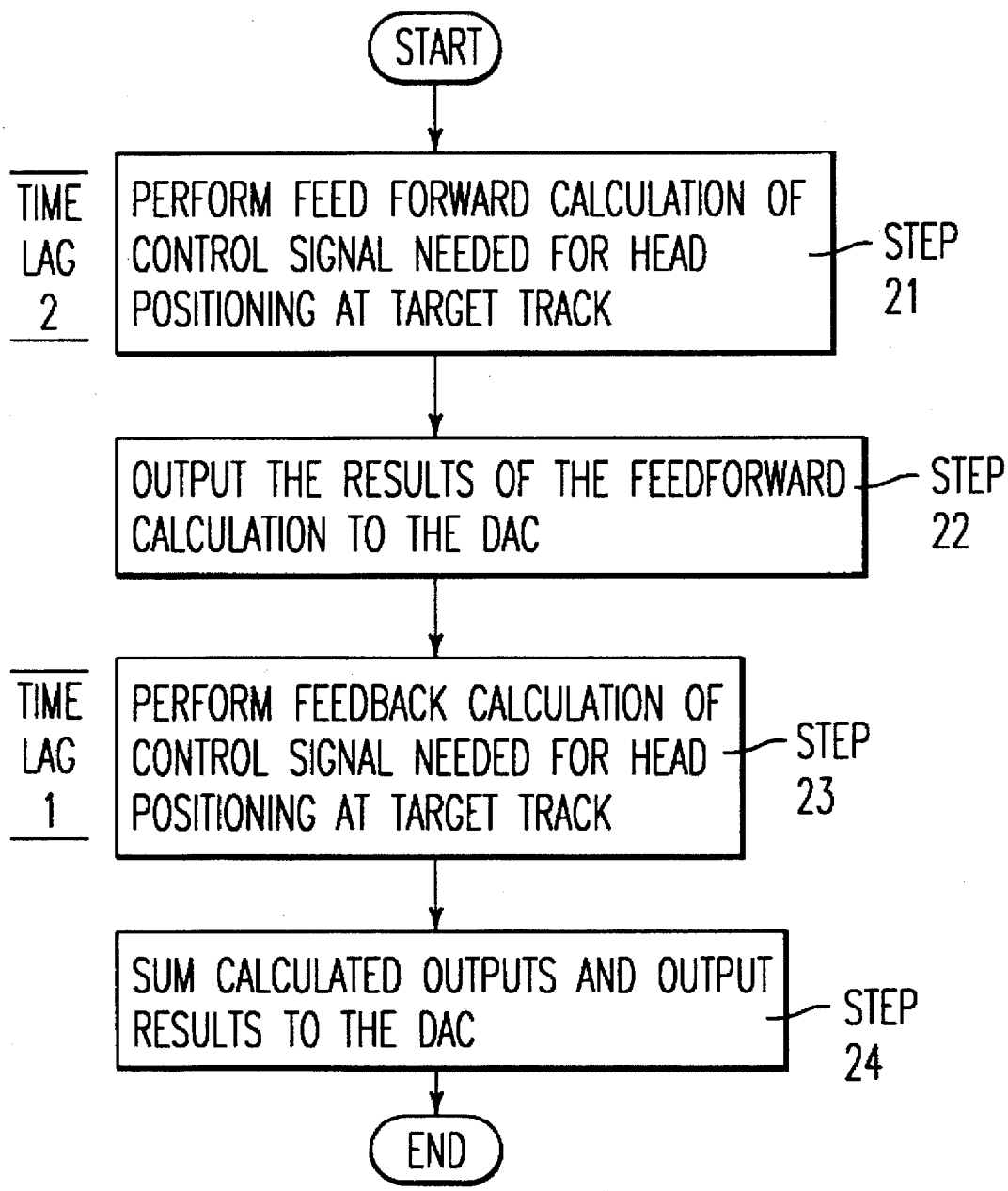
FIG. 6B is a flow chart for explaining the operation of a disk controller as shown in FIG. 5.
Figure 8:
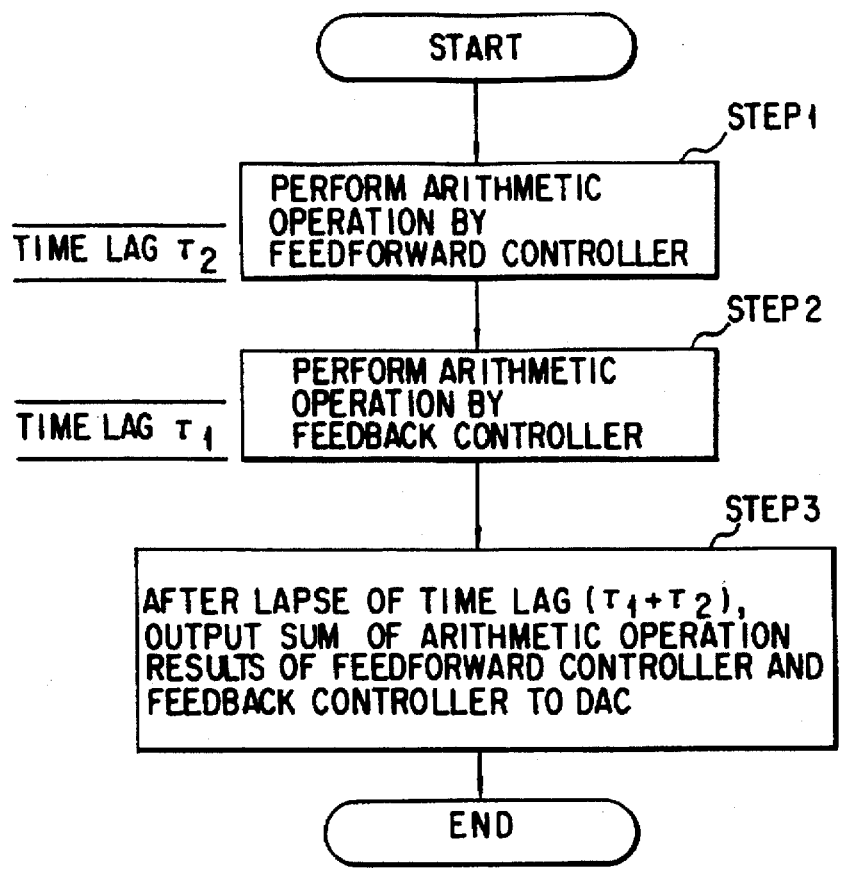
FIG. 8 is a flow chart for explaining the operation of the conventional control device.
Figure 9:
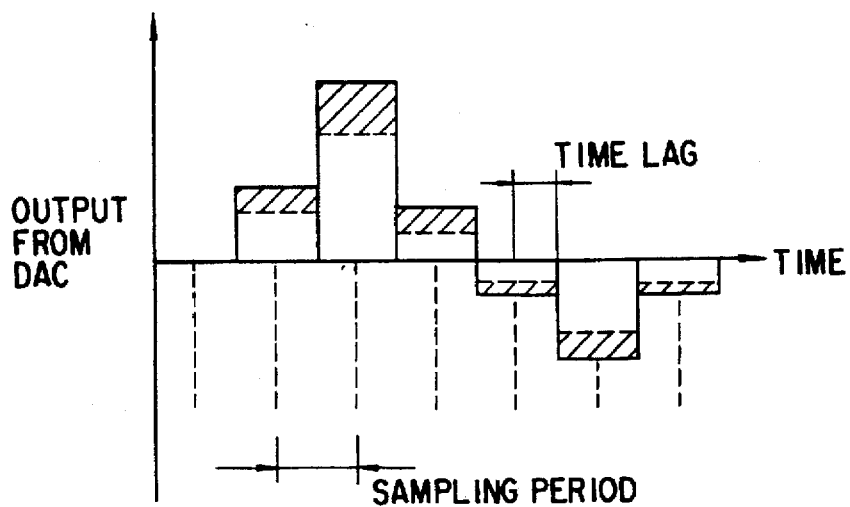
FIG. 9 is a chart for explaining a digital control signal output from the DAC to the controlled system.

The operation of the disk controller 46 will now be described with reference to the flow chart shown in FIG. 6B.

The position information 42 recorded on the magnetic disk plate 41 is read by the head 43 as a position signal and output to the disk controller 46 as a position information signal through the head amplifier 44 and the position information detector 45.

In the disk controller 46, an arithmetic control operation is performed by the feedforward controller 62 based on a target variable input from the outside (e.g., the personal computer body). At this time, the arithmetic operation time of the feedforward controller 62 requires the lag time $\tau_2$ (step 21).

After the lapse of the lag time $\tau_2$, a control signal from the feedforward controller 62 is input to the digital/analog converter 47 through the adder 65 (step 22).

Subsequently, the feedback controller 61 performs an arithmetic control operation of a signal as the sum of the head reference input signal and the position information signal output from the adder 66. At this time, the arithmetic operation time of the feedback controller 61 requires the lag time $\tau_1$ (step 23).

After the lapse of the lag time $\tau_1$, a control signal from the feedback controller 61 is added by the adder 65 with the control signal output from the time lag element 64, and the sum is output to the digital/analog converter 47 (step 24).

The arithmetic control operation of the disk controller 46 is performed while the head 43 passes a portion between pieces of position information stored on the magnetic disk plate 41.

More specifically, the number of times of the output operation of the manipulated variable which is output by the digital/analog converter 47 in the stepwise manner is larger than the number of times of crossing of the head 43 which moves across the pieces of the position information stored on the magnetic disk plate 41.

In other words, the feedback and feedforward controllers 61 and 62 do not output all the results of the arithmetic operations at once, but sequentially output the control signals to the digital/analog converter 47 upon completion of each arithmetic operation.

Accordingly, according to the disk apparatus employing the control device of this embodiment, since a control signal can be output upon completion of an arithmetic operation by each of the feedback and feedforward controllers 61 and 62, the degradation in control performance accompanying a control lag time can be decreased.

In the above embodiments, the magnetic disk apparatuses have been described. However, the present invention can similarly be applied to the control device of an optical disk apparatus or a magneto-optical disk apparatus, as a matter of course.

In the disk apparatus employing the control device of the embodiment described above, only the control device constituted by a combination of feedback and feedforward controllers has been described. However, the present invention can similarly be applied to a control device constituted by only feedback controllers or feedforward controllers, as a matter of course.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A head positioning device for moving a head from a present position on a disk record to a target track position on the disk record, said head positioning device comprising:

a target track designating element providing a first signal indicating the target track position on the disk record;

a feedforward controller portion receiving said first signal and calculating a basic head position control signal as a function of the first signal and the present position of the head relative to the disk record, said basic head position control signal being outputted by said first feedforward controller portion after a first interval of time;

a head position information detector providing a second signal indicating a real time position of said head relative to track locations on said disk record;

a feedback controller portion receiving said second signal indicating the real time position of the head and the first signal indicating the target signal track location and calculating a feedback corrected head position control signal as a function of the first and second signals, said feedback corrected head position control signal being outputted by said feedback controller portion after a second period of time following said first period of time;

an output head control signal producing portion receiving and processing said basic head position control signal and said feedback corrected head position control signal to provide a first operative head position control signal as said basic head position control signal at the expiration of the first period of time and at all other times that the feedback corrected head control signal is not received and to provide a second operative position head control signal as a summation of the basic head position control signal and said feedback corrected head position control signal when said feedback corrected head position control signal is received; and a head positioning actuator connected to receive the first and second operative head position control signals to move the head to the target track position.

2. A head positioning device according to claim 1, wherein said feedforward controller portion, said feedback controller portion, and said output head position control signal producing portion are all portions of one disk controller.

3. A head positioning device according to claim 1, wherein said feedback controller portion is a controller selected from the group consisting of a proportion controller, an integration controller, and a differentiation controller.

* * * * *